United States Patent [19]

Ninomiya

[11] 4,120,000

[45] Oct. 10, 1978

[54] VIDEO TIME BASE CORRECTOR

[75] Inventor: Takeshi Ninomiya, Tokyo, Japan

[73] Assignee: Sony Corporation, Tokyo, Japan

[21] Appl. No.: 817,662

[22] Filed: Jul. 20, 1977

Related U.S. Application Data

[63] Continuation of Ser. No. 703,650, Jul. 8, 1976, Pat. No. 4,054,903.

[51] Int. Cl.$^2$ .............................................. H04N 5/76
[52] U.S. Cl. ........................................ 358/8; 360/36
[58] Field of Search ............................. 358/8; 360/36

[56] References Cited

U.S. PATENT DOCUMENTS

| | | | |
|---|---|---|---|
| 3,971,063 | 7/1976 | Michael et al. | 358/8 |
| 3,978,519 | 8/1976 | Stalley et al. | 358/8 |

*Primary Examiner*—Richard Murray
*Attorney, Agent, or Firm*—Lewis H. Eslinger; Alvin Sinderbrand

[57] ABSTRACT

In a time base corrector which converts incoming video signals to digital form and writes the digitized signals in sequentially enabled units of a main memory at a clocking rate varying generally in accordance with time base errors in the incoming signals, whereupon the signals temporarily stored in the memory are read out or fetched from the successive main memory units at a clocking rate which is standard at least at the beginning and end of each line interval and the read out signals are reconverted to analog form for eliminating the time base errors: the clocking rate for reading out the video signals from each of the main memory units is modulated during each line interval in accordance with velocity error information stored in a velocity error memory during writing of such video signals in the respective main memory unit.

7 Claims, 11 Drawing Figures

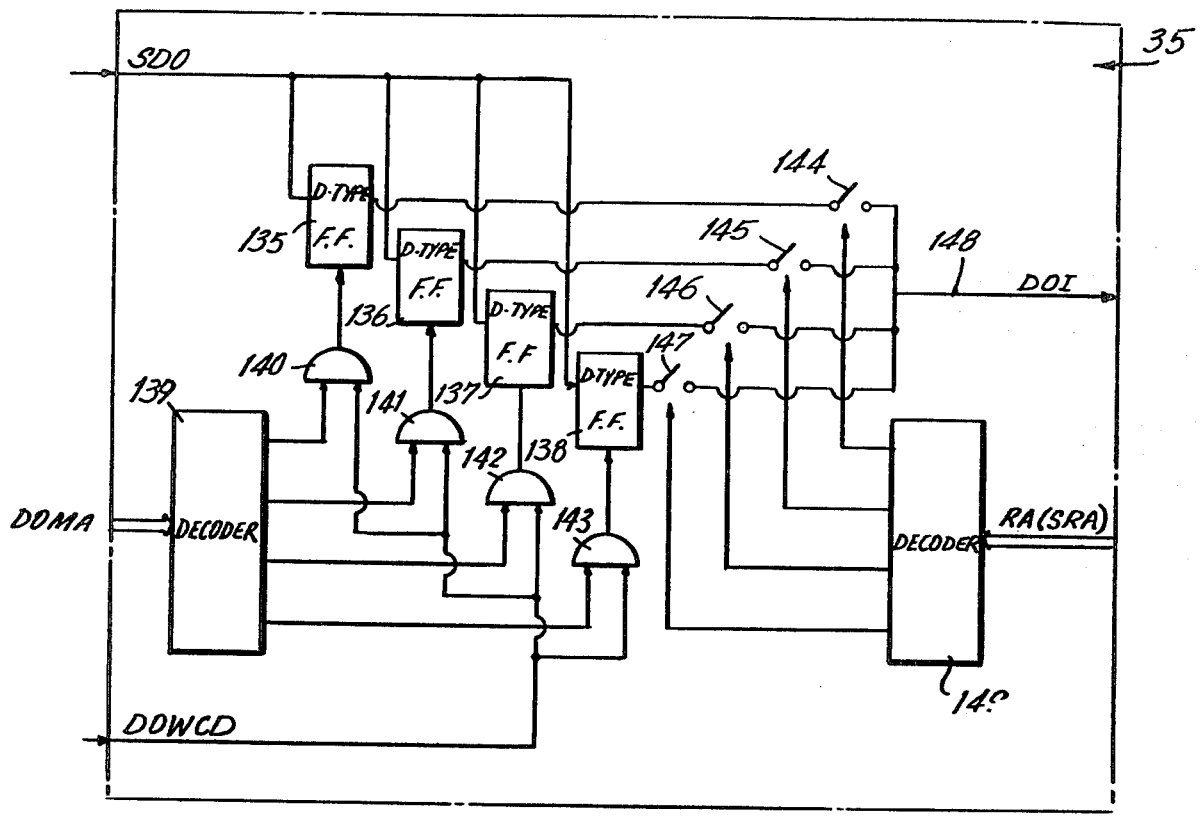
FIG.7
FIG.8
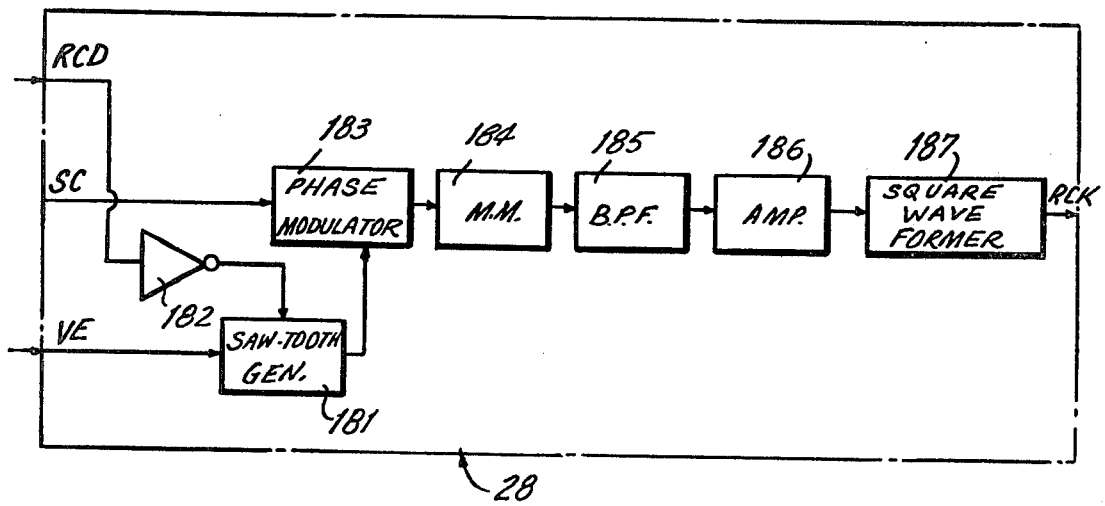

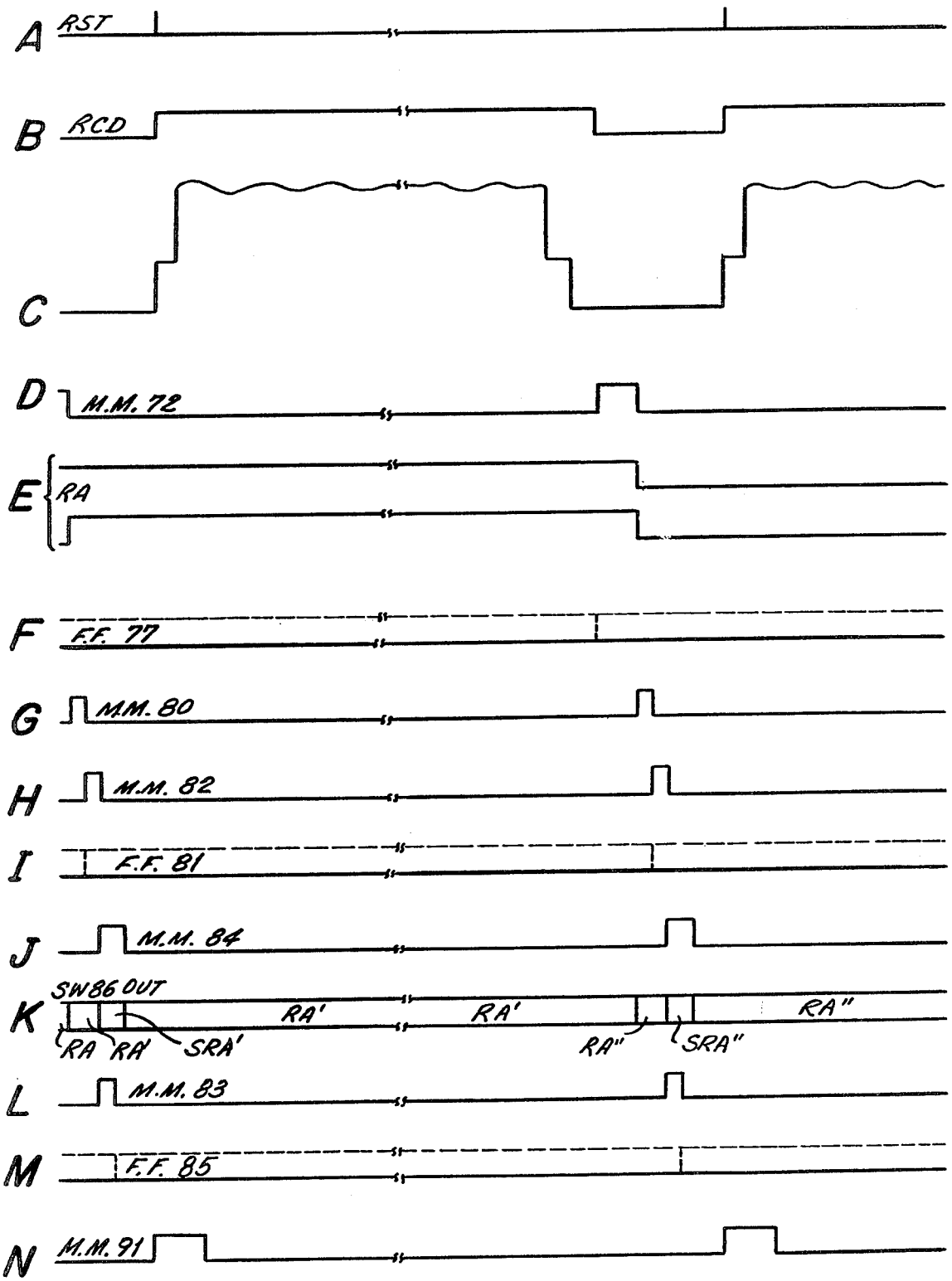

VIDEO TIME BASE CORRECTOR

CROSS-REFERENCE TO RELATED APPLICATION

This application is a continuation of my pending U.S. patent application Ser. No. 703,650, filed July 8, 1976, now U.S. Pat. No. 4,054,903 and having a common assignee herewith.

BACKGROUND OF THE INVENTION

1. Field of the Invention

This invention relates to the processing of periodic information signals, such as, video signals, and more particularly is directed to apparatus by which time base errors introduced during recording and/or reproducing of such signals may be removed.

2. Description of Prior Art

Video signals are frequently recorded on magnetic tape and subsequently reproduced for later broadcasting or viewing purposes. During the reproduction of recorded video signals, time base or frequency errors are usually introduced by reason of expansion or contraction of the record medium during or after recording, variation in the speed of the tape relative to the magnetic head or heads during recording or reproduction, variation between the tape recording speed and the tape reproducing speed, and the like. Such time base errors, when present in the reproduced video signals, cause a frequency shift of the latter which can result in many observable undesirable effects, particularly when the reproduced video signals are to be transmitted or broadcast and may be mixed with live broadcast material that do not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

In an existing time base corrector for substantially removing time base errors from video signals, for example, as disclosed in U.S. Pat. No. 3,860,952, issued Jan. 14, 1975, the incoming video signals are converted from analog to digital form and temporarily stored in a memory. Time base errors are removed from the video signals by writing the digitized signals in the memory at a clocking rate which varies in a manner generally proportional to the time base errors, and by fetching or reading out these stored signals at a standard clocking rate. After such reading out of the digitized video signals, the latter are reconverted to analog form and applied to an output terminal. The memory used in the known time base corrector comprises a plurality of memory units each capable of storing one or more horizontal lines of video information. A sequence control unit controls the selection of each memory unit for writing and reading so that the sampled video information is sequentially stored by cyclically enabling the plurality of memory units and serially storing one or more lines of digitized video information in each selected memory unit, and further so that, contemporaneously with the storage of sampled video information in a selected memory unit, the sequence control unit enables the video information stored in a different one of the memory units to be sequentially fetched or read out therefrom, with the enabling of the memory units for the reading out of the information stored therein being also effected in a cyclical manner. However, the arrangement disclosed in the above identified patent for preventing double clocking of a single memory unit, that is, an attempt to read and write contemporaneously from the same memory unit in response to an excessive time base error, results in at least one incomplete or deteriorated line interval signal, and possibly even two incomplete or deteriorated line interval signals which are out of horizontal synchronization with each other and which are present in the output from the time base corrector. Further, the above referred to existing time base corrector is not capable of eliminating from its output those line intervals of the incoming video signals in which drop-outs may occur.

In view of the above, it has been proposed, for example, in U.S. patent application Ser. No. 642,197, filed Dec. 18, 1975, and having a common assignee herewith, to provide a time base corrector generally of the type described above and in which those line intervals of the incoming video signals having drop-outs occurring therein are omitted from the output of the time base corrector and replaced by previously stored line intervals of similar video information. In such time base corrector, the elimination of video signals containing drop-outs is achieved merely by extending the writing period of a memory unit in response to a detected drop-out in the incoming video signals so as to store, in such memory unit, the next occurring line interval which is free of drop-out, and, thereafter, during reading out of the stored signals, the line interval preceding the detected or omitted line interval is read twice to replace the omitted line interval. The foregoing arrangement is generally satisfactory except in the case where drop-outs occur in two or more successive line intervals of the incoming video signals, in which case the line interval preceding the onset of drop-out is repeated three or more times in the output of the time base corrector and such repetition of a single line interval may be perceptible in the picture reproduced from the corrected video signals. Moreover, in order to avoid double-clocking of a memory unit in response to excessive time base errors in the incoming video signals, the writing or reading period of a memory unit is extended, for example, from a normal one line interval to two line intervals, and such concept for avoiding double-clocking may accentuate the above problem associated with the elimination of drop-out.

Further, in the existing time base correctors, as described above, the read out of the temporarily stored digitized video signals is effected at a fixed, standard clocking rate, and thus cannot compensate for velocity or phase errors occurring within a line interval of the incoming video signals.

OBJECTS AND SUMMARY OF THE INVENTION

Accordingly, it is an object of the invention to provide an improved time base corrector particularly suited for processing video signals, and in which the previously described problems are effectively avoided.

More specifically, it is an object of this invention to provide a time base corrector, as aforesaid, having an improved arrangement for omitting from its output line intervals of video information having drop-outs therein.

Another object is to provide a time base corrector as aforesaid, in which the reading of video information from the memory is effected at a standard clocking rate which is modulated in accordance with velocity errors occurring in such video information as written in the memory.

Still another object is to provide a time base corrector, as aforesaid, in which the compensation for velocity errors is coordinated with the elimination of drop-out in the output of the time base corrector so as not to be disturbed by the drop-out elimination.

In accordance with an aspect of this invention, in a time base corrector which converts incoming video or other periodic information signals to digital form and writes the digitized signals in a main memory at a clocking rate varying generally in accordance with time base errors in the incoming signals, whereupon the signals temporarily stored in the main memory are read out or fetched therefrom at a standard clocking rate and reconverted to analog form for eliminating the time base errors, and in which the main memory is composed of a plurality of cyclically enabled memory units: a drop-out memory is provided for storing drop-out information in respect to drop-outs detected in the incoming video information written in each of the main memory units; the drop-outs are eliminated by rewriting, in each memory unit storing information having drop-out, information free of drop-out from another memory unit simultaneously with the reading of such other memory unit; and, upon such rewriting of information in a memory unit, the stored drop-out information in respect to that memory unit is erased from the drop-out memory.

Further, in accordance with a feature of this invention, a time base corrector as described above is provided with a velocity error memory for storing velocity error informations as to the velocity errors in the incoming video signals as written in the several main memory units, and such velocity error informations are sequentially read simultaneously with the reading of the video information from the respective main memory units for modulating the clocking rate at which the reading is effected. Furthermore, when video information is rewritten in a main memory unit for eliminating drop-out, as described above, the velocity error memory exchanges the velocity error information associated with the rewritten video information for the velocity error information associated with the video information originall written in the respective main memory unit.

The above, and other objects, features and advantages of the invention, will be apparent in the following detailed description of an illustrative embodiment which is to be read in conjunction with the accompanying drawings.

BRIEF DESCRIPTION OF THE DRAWINGS

FIG. 7 is a schematic block diagram illustrating details of a drop-out memory included in the time base corrector of FIG. 1;

FIG. 8 is a schematic block diagram illustrating details of a read clock generator included in the time base corrector of FIG. 1;

FIGS. 10A-L and 11A-N are waveforms to which reference will be made in explaining the operation of the system control of FIG. 5 during writing and reading operations, respectively.

DESCRIPTION OF A PREFERRED EMBODIMENT

Figure 1:
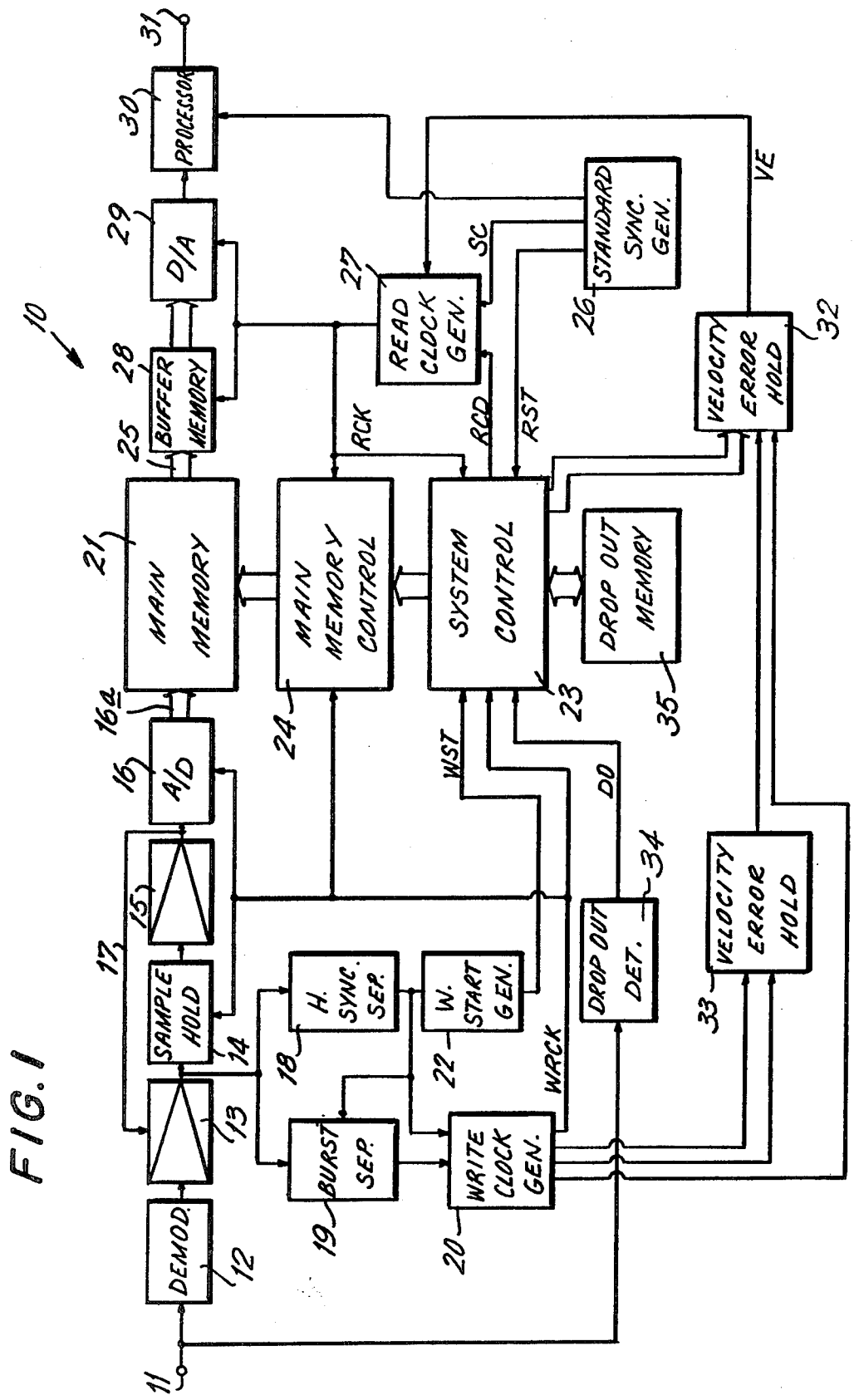
FIG. 1 is a schematic block diagram of a time base corrector according to an embodiment of this invention.

Referring to the drawings in detail, and initially to FIG. 1 thereof, it will be seen that a time base corrector 10 according to ghis invention has an input terminal 11 for receiving periodic information signals, such as composite color video signals reproduced by a so-called VTR and having time base errors. If the reproduced composite color video signals applied to terminal 11 are not already in the standard NTSC form, such signals are applied to a demodulator 12 which may include an NTSC encoder. The resulting NTSC color video signals are applied through a buffer amplifier 13 to a sample-hold circuit 14 and from the latter through an amplifier 15 to an analog-to-digital (A/D) converter 16. As shown, a D.C. restoring loop 17 is provided between amplifiers 13 and 15 so that the NTSC color video signals are sampled in D.C. restored form.

The D.C. restored NTSC color video signals issuing from amplifier 13 are further applied to a separator 18 which separates horizontal synchronizing signals therefrom, and to a separator 19 which is gated by the separated horizontal synchronizing signals so as to separate burst signals from the NTSC color video signals. The separated horizontal synchronizing signals and burst signals are applied to a write clock generator 20 which, as is hereinafter described in detail, produces write clock pulses WRCK having a relatively high frequency, for example, of about 10.74 MHz which is three times the color or chrominance subcarrier frequency $f_c$ for NTSC signals, and with their frequency or repetition rate and phase being varied in accordance with changes in the frequency and phase, respectively, of the horizontal synchronizing signals and the subcarrier burst signals extracted from the incoming color video signals so as to closely follow, or be dependent upon time base errors in such incoming signals.

Further, it will be seen that the write clock pulses WRCK issuing from generator 20 and having a frequency of approximately 10.74 MHz are applied to A/D converter 16 and to sample-hold circuit 14 to control the rate at which the latter samples the demodulated or detected video signals and the rate at which converter 16 converts the sampled signals from their original analog form into digital form. More specifically, in response to each write clock pulse from generator 20, A/D converter 16 is operative to sample the demodulated video signal and convert the latter into a plurality of parallel bit signals, for example, digital information of eight parallel bits.

The parallel bits of digitized signal information are supplied from converter 16 to main memory 21 by way of a digital information bus 16a which, for ease of illustration, is represented by a double line. The main memory 21 is shown on FIG. 6 to include memory units MU-1, MU-2, MU-3 and MU-4, each of which is comprised of a plurality of shift registers equal in number to the number of parallel bits making up each word of the digitized video signals. Thus, in the example being described, each of the four memory units MU-1, MU-2, MU-3 and MU-4 is made up of eight shift registers.

Figure 2:
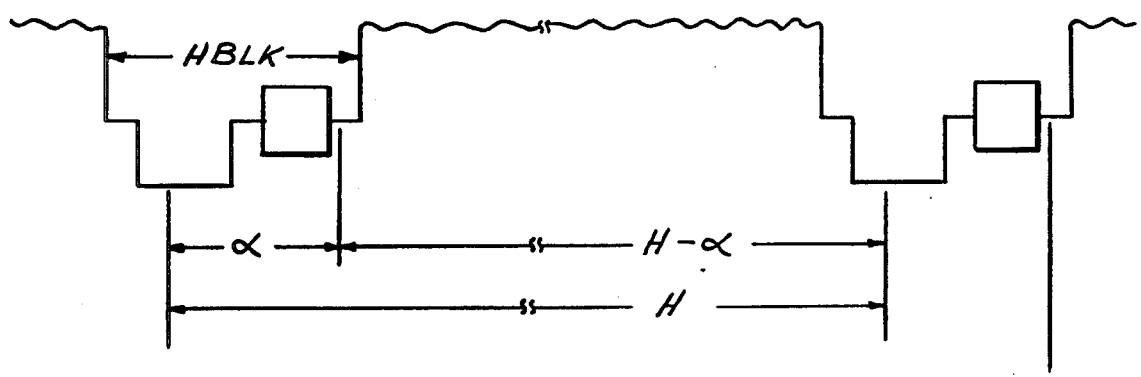
FIG. 2 is a schematic diagram illustrating a color video signal that may be applied to the time base corrector of FIG. 1 for removal of time base errors from such signal.

Each shift register of the memory units MU-1, MU-2, MU-3 and MU-4 is desirably selected to have a storage capacity or memory which, in consideration of the frequency of the write clock pulses from generator 20, is sufficient to store the digitized information corresponding to one or more, and preferably an even number, that is, 2, 4, 6, 8—etc. of the horizontal or line intervals of the incoming video signals. In the case of NTSC color video signals and a write clock pulse frequency of about 10.74 MHz, there are 682.5 words of digital information for each horizontal or line interval indicated at H on FIG. 2. However, in the illustrated time base corrector, the horizontal synchronizing signals and burst signals occurring during the interval $\alpha$ in each horizontal blanking period are preferably stripped from the incoming video signals prior to the conversion of the latter to digital form so that, for example, only 640 words of digital information need to be accommodated in the registers of memory units MU-1, MU-2, MU-3 and MU-4 for each of the horizontal or line intervals to be stored therein.

The separated horizontal synchronizing signals are further shown to be applied to a write start generator 22 which produces write start pulses WST at predetermined intervals, for example, at the beginning of every horizontal or line interval of the incoming video signals in the case where digital information corresponding to one horizontal or line interval is to be stored in each of the memory units.

The write start pulses WST from generator 22, and the write clock pulses WRCK from generator 20 are applied to a system control 23 which, as hereinafter described in detail, controls the operations of a main memory control 24 for effecting the selective writing and reading operations of the memory units MU-1, MU-2, MU-3 and MU-4. Generally, under normal circumstances, system control 23 causes main memory control 24 to produce write control signals occurring in a repeating cyclic order and which are respectively applied to the memory units MU-1, MU-2, MU-3 and MU-4 in order to determine the sequences in which such memory units are selected or enabled for the writing, in the selected memory unit, of the digitized information corresponding to the desired number of horizontal or line intervals of the incoming video signals. Further, the memory control 24 receives the write clock pulses WRCK from generator 20 and, during the writing period determined by each write control signal, the memory control 24 supplied the write clock pulses WRCK to the respective memory unit MU-1, MU-2, MU-3 and MU-4 which is then selected or enabled for writing, so that the digitized information corresponding to the desired number of horizontal or line intervals of the video signals is written in the shift registers of the selected memory unit at the clocking rate determined by the frequency of the write clock pulses WRCK which varies in accordance with time base errors in the incoming video signals.

After momentary storage in memory units MU-1, MU-2, MU-3 and MU-4, the digitized video signal information is read out therefrom in a predetermined sequence to an information or data bus 25. In order to determine the clocking rate at which the digitized information is read out of each of the memory units, the illustrated time base collector 10 includes a standard sync generator 26 which supplies a carrier signal at a fixed or standard frequency, for example, the standard chrominance subcarrier frequency $f_c$ of 3.58 MHz for NTSC color video signals, to a read clock generator 27 which, in turn, produces read clock pulses RCK having a standard frequency, for example, 10.74 MHz, at least at the beginning and end of each reading period. The standard sync generator 26 is further shown to produce read start pulses RST, for example, at intervals corresponding to the desired number of the horizontal or line intervals of NTSC video signals stored in each memory unit.

The read start pulses RST from generator 26 are applied to system control 23, and the read clock pulses RCK are applied from generator 27 to system control 23 and main memory control 24. Under normal circumstances, system control 23 causes main memory control 24 to produce read control signals occurring in a repeating cyclic order and which are respectively applied to memory units MU-1, MU-2, MU-3 and MU-4 in order to determine the sequence in which such memory units are selected or enabled for the reading out therefrom of the digitized information corresponding to the number of horizontal or line intervals which had been previously stored in the selected memory unit. Further, during the reading period determined by each read control signal, the memory control 24 supplies the read clock pulses RCK to the selected or enabled memory unit, so that the digitized information corresponding to one or more horizontal or line intervals of the video signals is read out of the shift registers of the selected memory unit at the standard clocking rate of the read clock pulses RCK.

The read clock pulses RCK are also applied to a buffer memory 28 which receives the digitized information sequentially read out of main memory 21, and to a digital-to-analog (D/A) converter 29 which is operative to convert the buffered digital output of memory 28 back to the original analog form. The analog output of D/A converter 29 is applied to a processor 30 which receives the standard frequency carrier signal from generator 26, and which is operative to add to the output of converter 29 the color burst and composite synchronizing signals which were previously stripped from the incoming video signals. The resulting composite color video signals are then obtained at an output terminal 31 of processor 30.

In order to correct for velocity errors that may appear in the incoming video signals, the time base corrector 10 according to this invention further detects the velocity error at the write clock generator 20 during each writing period and then supplies the detected velocity error to a velocity error memory 32 by way of a velocity error hold circuit 33. The velocity error memory 32, under the control of system control 23, memorizes the velocity error detected during the writing period of each of the memory units MU-1, MU-2, MU-3 and MU-4, and, during the reading period of each of the memory units, applies a corresponding velocity error correcting signal to read clock generator 27 by which the read clock pulses RCK from the latter are suitably modulated to eliminate or compensate for the velocity errors, as hereinafter described in detail. Thus, the read clock pulses RCK, while having the standard frequency at the beginning and end of each reading period, may vary in phase during such reading period.

Further, the time base corrector 10 according to this invention is shown to be provided with a drop-out detector 34 which is connected with input terminal 11 for detecting any drop-out in the incoming video signals and providing a corresponding drop-out signal DO to the system control circuit 23, and with a drop-out memory 35 in which information concerning the occurrence of drop-out in the incoming video signals is stored for influencing the reading sequences of the memory units and for effecting writing in the latter of video information free of drop-out so as to eliminate such drop-out from the time base corrected video signals obtained at output terminal 31, as hereinafter described in detail.

Figure 3:
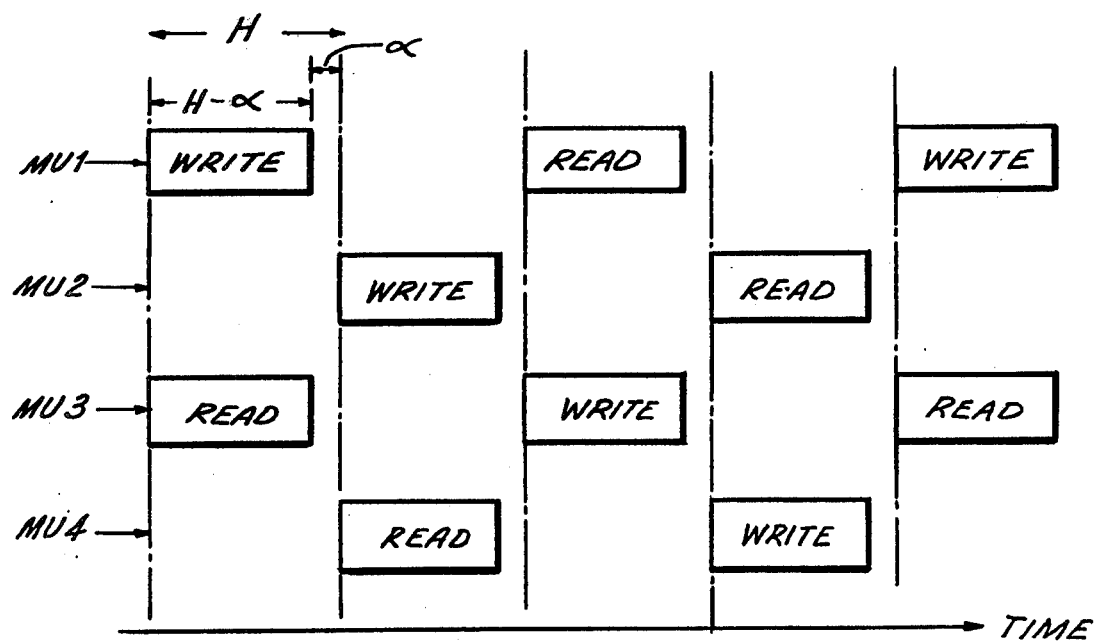
FIG. 3 is a timing chart showing the cyclic orders in which signal information may normally be written in, and read out of the several memory units of the time base corrector of FIG. 1.

As is shown on FIG. 3, in the illustrated time base corrector 10, the cyclically occurring write control signals for sequentially writing digital information corresponding to any desired number of horizontal or line intervals in each of the memory units MU-1, MU-2, MU-3 and MU-4 may normally occur simultaneously with the cyclically occurring read control signals for sequentially reading out the digital information previously stored in the respective memory units MU-3, MU-4, MU-1 and MU-2, respectively.

WRITE CLOCK GENERATOR

Figure 4:
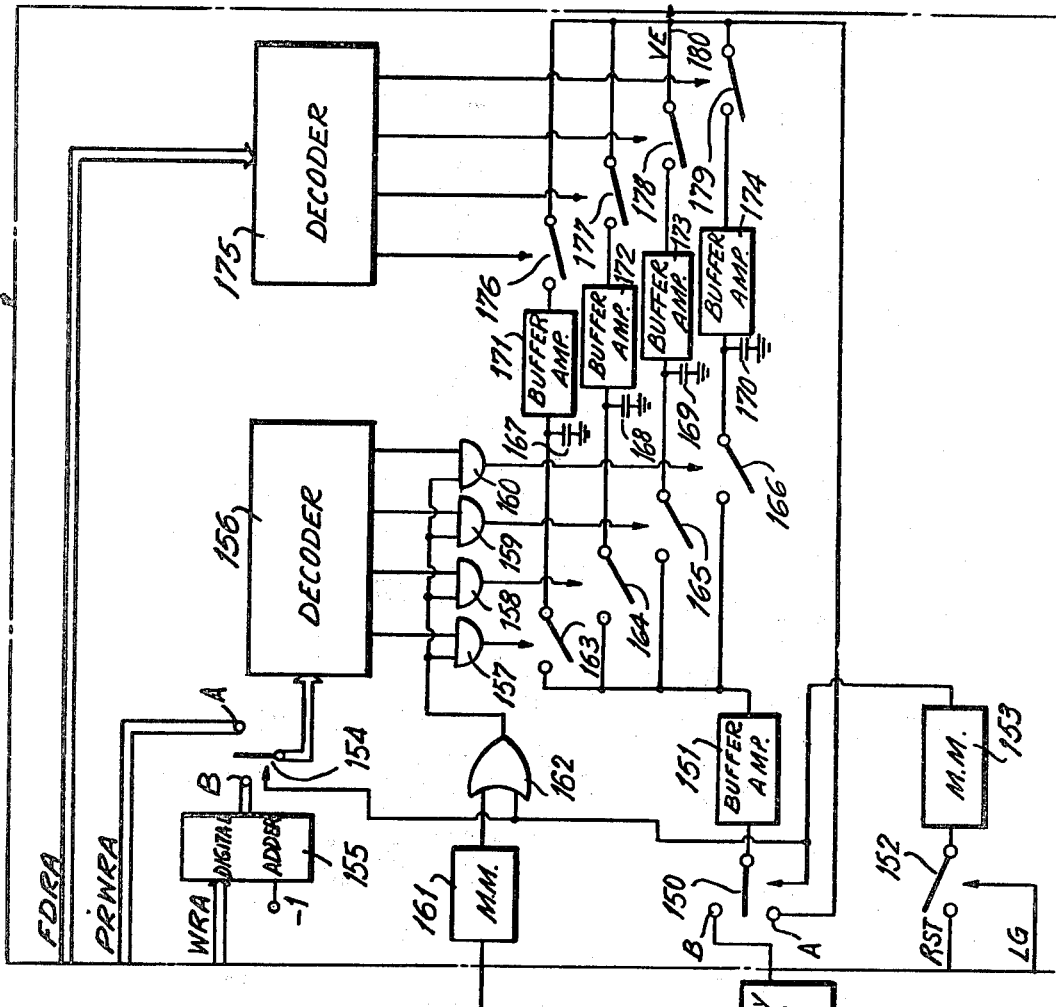
FIG. 4 is a schematic block diagram illustrating details of a write clock generator and a velocity error memory which are included in the time base corrector of FIG. 1.
Figure 4:
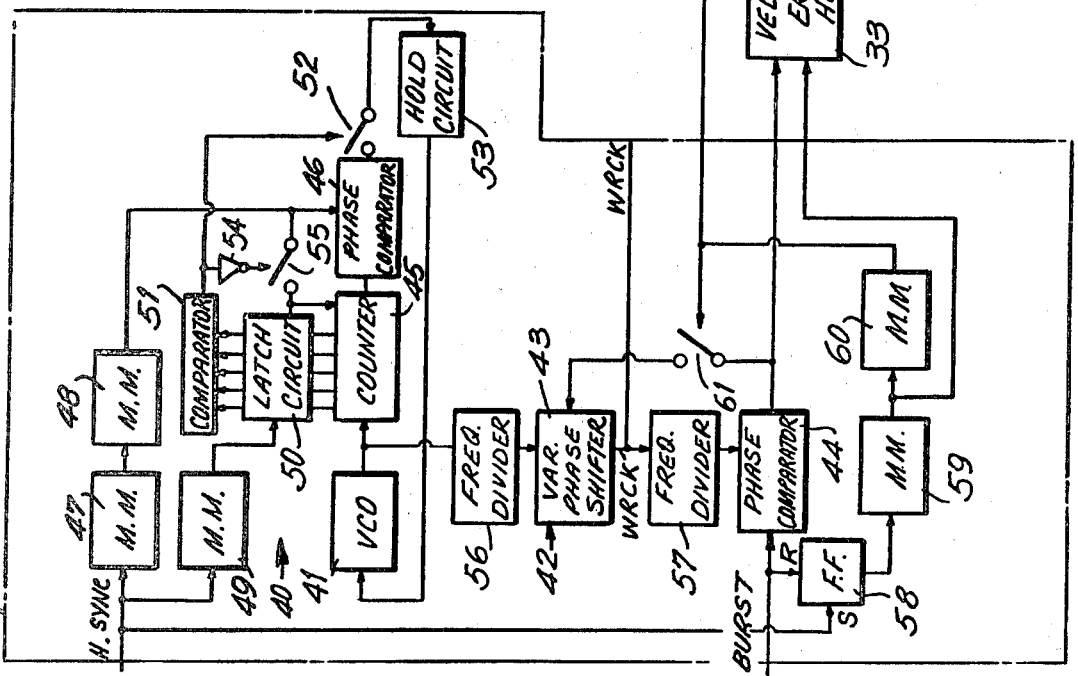

Referring now to FIG. 4, it will be seen that the write clock generator 20 of the time base corrector 10 according to this invention may generally comprise an automatic frequency control circuit 40 having a variable frequency oscillator or VCO 41 with its control voltage being determined by comparison of a suitably divided output of VCO 41 with the horizontal synchronizing signals received from separator 18, and an automatic phase control circuit 42 having a variable phase shifter 43 which receives a suitably divided output of VCO 41 and which is controlled by a phase comparator 44 comparing a suitably divided output of phase shifter 43 with the burst signals received from separator 19.

More particularly, it will be seen that, in the write clock generator 20 illustrated on FIG. 4, the output of VCO 41 has a center frequency which is 2N times the chrominance subcarrier frequency of the color video signals being processed, for example, 6 × 3.58 MHz or 21.48 MHz in the case of NTSC color video signals and N being 3, and such output from VCO 41 is supplied to a counter 45 which operates as a frequency divider dividing by 455×N. Thus, counter 45 provides a divided output at the horizontal or line frequency of 15.75 KHz, and such divided output is applied to one of the inputs of a phase comparator 46. The horisontal synchronizing signal (FIG. 9B) separated from the incoming video signal (FIG. 9A) by separator 18 triggers a monostable multivibrator 47 acting as a delay, and the falling side of the output pulse (FIG. 9E) from monostable multivibrator 47 triggers a monostable multivibrator 48 to provide an output pulse (FIG. 9F) from the latter which is in predetermined timed relation to the horizontal synchronizing signal and is applied to another input of phase comparator 46 for comparison in the latter with the divided output of VCO 41 obtained from counter 45. The horizontal synchronizing signal from separator 18 further triggers a monostable multivibrator 49 to provide an output pulse (FIG. 9C) which, at its falling side, actuates a latch circuit 50 for latching the contents of counter 45 at such time. A digital comparator 51 receives the latched contents of counter 45 from latch circuit 50 and detects the difference between the phase of the incoming horizontal synchronizing signal or pulse and the phase of the divided output from counter 45 as indicated by the latched contents of such counter. The digital comparator 51 provides an output signal of a relatively high level "1" when the phase difference detected by comparator 51 lies within predetermined limits, such as, for example ± 0.5 microseconds, whereas, the output signal from comparator 51 has a low level "0" when the detected phase difference exceeds the predetermined limits. Such output signal from digital comparator 51 is employed to actuate a switch or gate 52 which, so long as the output signal from comparator 51 has its relatively high value "1", conducts the output of phase comparator 46 to a hold circuit 53 which, in turn, has its output connected to VCO 41 as the control voltage for the latter. The output signal from digital comparator 51 is further applied through an inverter 54 for actuating a switch or gate 55 through which the output signal of monostable multivibrator 48 is selectively applied to counter 45 for resetting the latter at the falling side of the output signal or pulse from monostable multivibrator 48. The switch 55 is in its open condition, as shown in full lines on FIG. 4, so long as the output signal from digital comparator 51 is at its high level "1" for closing switch 52, whereas, when the output signal from comparator 51 is at its low level "0", switch 55 is closed simultaneously with the opening of switch 52.

It will be apparent that, in the automatic frequency control circuit 40 as described above, phase comparator 46 will normally compare the phases of the incoming horizontal synchronizing signals and of the divided output of VCO 41 as obtained from counter or frequency divider 45 and, on the basis of such comparison, provide a control signal which is supplied through closed switch 52 to hold circuit 53. The resulting output of hold circuit 53 is applied, as a control voltage, to VCO 41 so as to adjust the output frequency of the latter to a value which is held until the next horizontal synchronizing signal is received from separator 18. Thus, so long as the phase differences detected by comparator 51 are within the predetermined limits, the output frequency of VCO 41 will be varied in accordance with changes in the frequency of the incoming horizontal synchronizing signals, that is, in accordance with time base errors in the incoming color video signals. However, when there is a gross or abrupt time base error in the incoming color video signals to produce a corresponding abrupt or gross deviation in the timing of the horizontal synchronizing signals, for example, when the incoming signals are recorded video signals being reproduced by a video tape recorder in which a jumping or slippage of the tape may occur, the resulting excessive phase difference between a received horizontal synchronizing signal and the output of counter or frequency divider 45 causes comparator 51 to provide its output signal with the low level "0" so that switch 52 is opened and switch 55 is closed. The opening of switch 52 opens or interrupts the so-called phase locked loop for VCO 41 constituted by counter 45, phase comparator 46 and hold circuit 53 so that hold circuit 53 continues to apply the previously established control voltage to VCO 41 for maintaining the output frequency of the latter at its previously established value for another horizontal or line interval. The closing of switch 55 simultaneously with the opening of switch 52 causes the output signal or pulse from monostable multivibrator 48 to be effective, at its falling side, to reset counter 45. It will be noted that the delay provided by the monostable multivibrator 47 ensures that such resetting of counter 45 will be effected only after a time interval sufficient to allow actuation of the switches 52 and 55. From the foregoing, it will be apparent that the described automatic frequency control circuit 40 of the write clock generator 20 is effective to avoid overcorrection of the output from VCO 41 in response to the described gross or abrupt changes in the timing of the incoming horizontal synchronizing signals.

In the phase control circuit 42 of write clock generator 20, the output of VCO 41 having a central frequency of 21.48 MHz is supplied to variable phase shifter 43 through a divide-by-2 frequency divider 56 so as to have a central frequency of 10.74 MHz. The output of phase shifter 43, which is the write clock pulse WRCK for application to sample-hold circuit 14, A/D converter 16, system control 23 and main memory control 24, is also applied to phase comparator 44 through a divide-by-3 frequency divider 57 so as to have a central frequency of 3.58 MHz corresponding to the frequency of the burst signals (FIG. 9G) applied to phase comparator 44 from separator 19. The phase comparator 44 functions to detect velocity error in the incoming video signal and to control the variable phase shifter 43. More particularly, as shown, a flip-flop (F.F.) 58 is set by each horizontal synchronizing signal from separator 18 and is reset at the onset of the first of the corresponding burst signals from separator 19, as shown on FIG. 9H. The falling edge of the output (FIG. 9H) of F.F. 58 triggers a monostable-multivibrator (MM) 59 so that the latter produces an output (FIG. 9I) having its falling edge at about the center or later half of the separated burst (FIG. 9G) by which time the velocity error indicated by the output (FIG. 9K) of phase comparator 44 has become stable. The output of comparator 44 is applied to velocity error hold circuit 33 which also receives the output of MM 59 so that, at the falling edge of the output from MM 59, hold circuit 33 samples and holds (FIG. 9L) the output of comparator 44 which then accurately corresponds to the velocity error of the previous horizontal or line interval. The output of MM 59 is also applied to a monostable-multivibrator (MM) 60 which is triggered by the falling edge of the output (FIG. 9I) of MM 59 to produce an output (FIG. 9J) after the velocity error has been sampled and held in circuit 33. The output of MM 60, when at its high level "1", closes a normally open switch 61 through which the output of comparator 44 is applied to variable phase shifter 43 for controlling the latter in the direction to cause the output of phase comparator 44 to be reduced to zero. The period during which switch 61 is closed is determined by the duration of the output of MM 60, which duration is selected, in consideration of the time constant of the feedback loop constituted by frequency divider 57, comparator 44 and switch 61, so that phase shifter 43 can hold the phase shift corresponding to an error signal received from comparator 44 upon a closing of switch 61 for the interval until the switch 61 is again closed for applying the next error signal from phase comparator 44 to phase shifter 43.

SYSTEM CONTROL

Figure 5:
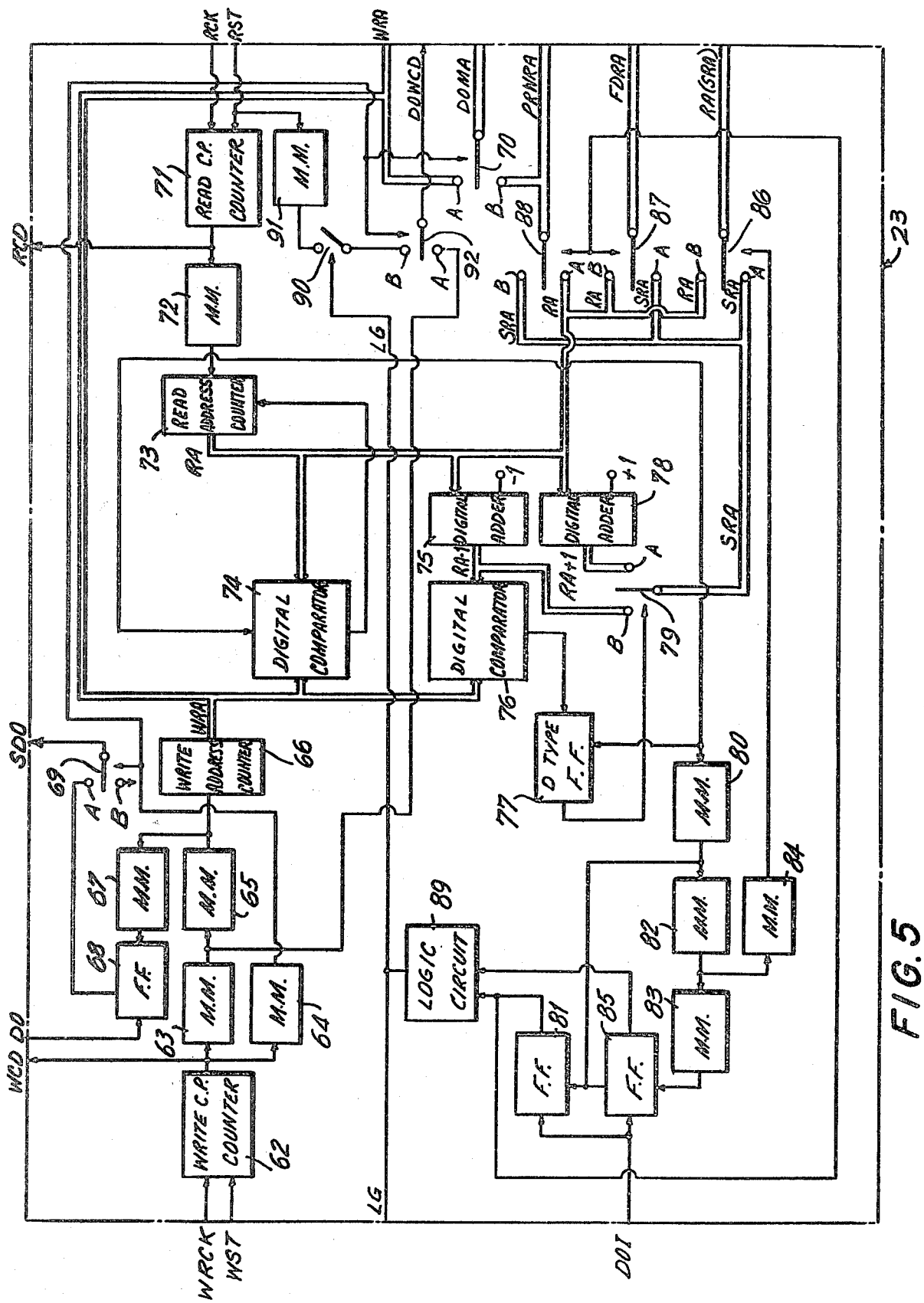
FIG. 5 is a schematic block diagram illustrating details of a system control included in the time base corrector of FIG. 1.
Figure 10:
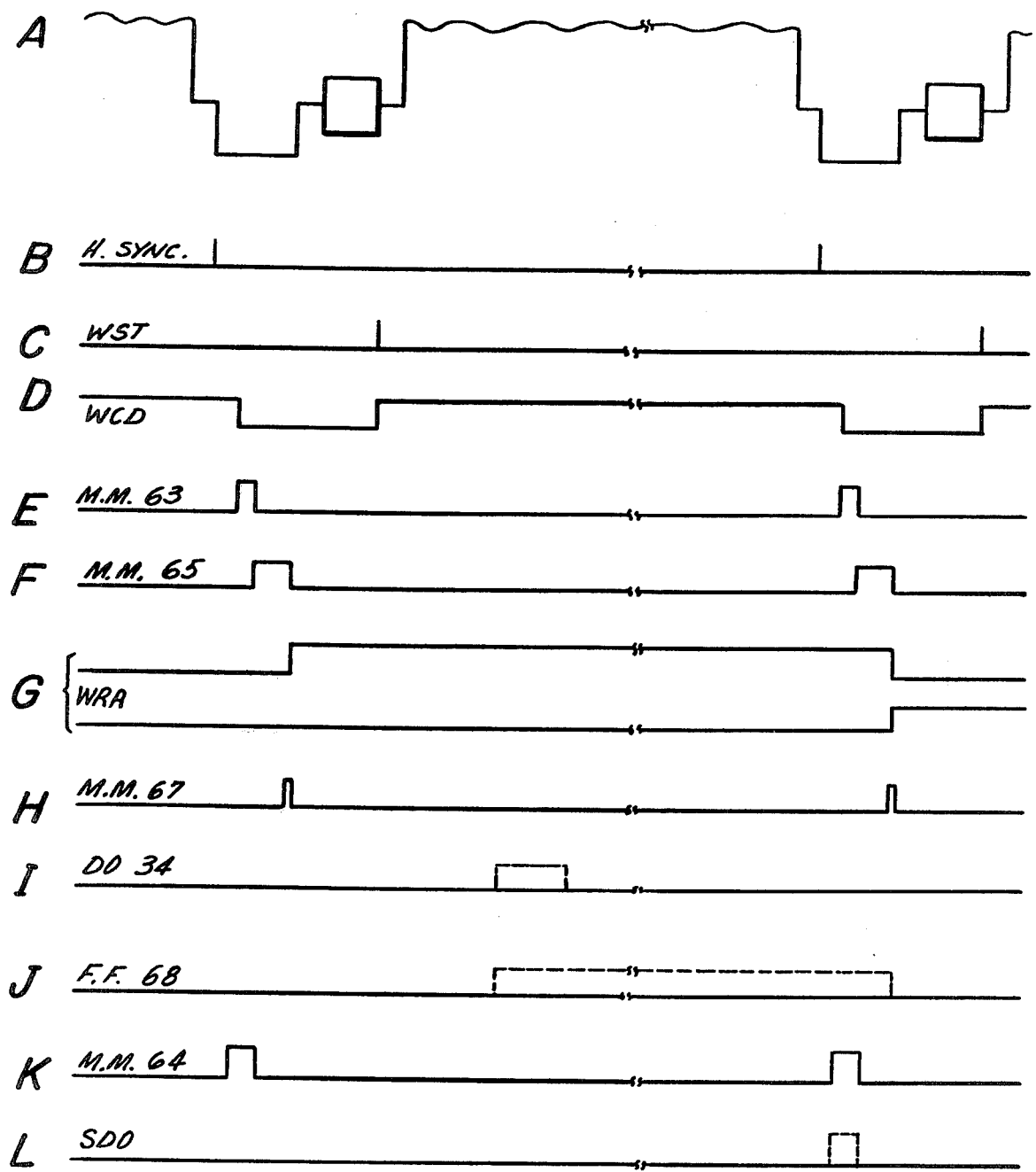

Referring now to FIG. 5, it will be seen that, in the system control 23 of the illustrated time base corrector 10 according to this invention, a counter 62 receives the write clock pulses WRCK from the write clock generator 20 and the write start pulses WST (FIG. 10C) from the generator 22. Each write start pulse WST initiates counting operation of counter 62 which then counts 640 write clock pulses WRCK. The output (FIG. 10D) of counter 62 is at a high level "1" to constitute a write command WCD during the counting operation of counter 62, that is, during the counting by the latter of 640 write clock pulses WRCK, and the output of counter 62 is at a relatively low level "0" during the intervals between counting operations. The write command WCD is applied to the main memory control 24 (FIGS. 1 and 6) and to two monostable multivibrators (MM) 63 and 64 in system control 23 which are both triggered by the falling edge of each write command (WCD) (FIGS. 10E and K). The output (FIG. 10E) of MM 63 is applied to a monostable multivibrator (MM) 65 which is triggered by the falling edge of each output of MM 63 to provide a corresponding output or pulse (FIG. 10F). The outputs or pulses from MM 65 are counted by a two-bit binary counter 66 which provides a two-bit binary output constituting a write control signal or address WRA (FIG. 10G) for selecting the memory unit of main memory 21 in which the digitized information from A/D converter 16 is to be written. The output of MM 65 is further shown to be applied to a monostable multivibrator (MM) 67 which is triggered by the falling edge of each output (FIG. 10F) of MM 65 to provide a pulse (FIG. 10H) for resetting a flip-flop (FF) 68 after the latter has been set by a drop-out signal DO (FIG. 10I) received by FF 68 from drop-out detector 34 (FIG. 1). Therefore, when a drop-out is detected to cause detector 34 to produce a drop-out signal DO, as indicated in broken lines on FIG. 10I, for setting FF 68, the output of FF 68 rises to a relatively high value "1", as indicated in broken lines on FIG. 10J, and retains that value "1" until FF 68 is reset by the falling edge of the output (FIG. 10H) from MM 67. The output of FF 68 is applied to a fixed contact A of a switch 69 which further has a grounded fixed contact B and a movable contact connected to drop-out memory 35. The switch 69 is controlled by the output (FIG. 10K) of MM 64 so as to normally engage its contact B and to change-over to its contact A only during each output or pulse from MM 64. Thus, if the output of FF 68 is at its high level "1" during the output or pulse from MM 64, that high level "1" is transmitted as a sensed drop-out signal SDO (FIG. 10L), through switch 69 to drop-out memory 35. It will be noted that the output or pulse from MM 64 is timed to occur after the completion of the writing of the digitized video information in a selected one of the memory units and before changing of the write address WRA corresponding to that selected memory unit.

Further, the write address WRA from counter 66 is shown on FIG. 5 to be applied to a fixed contact A of a switch 70 which is also controlled by the output of MM 64 and which has another fixed contact B and a movable contact connected to drop-out memory 35. The movable contact of switch 70 normally engaged its fixed contact B and is changed-over to engage its contact A only during the pulse or high-level output from MM 64. Therefore, when a sensed drop-out signal SDO is applied to drop-out memory 35 through switch 69, as previously described, the address WRA of the memory unit being written-in during such drop-out is simultaneously applied through switch 70 to drop-out memory 35 as a drop-out memory address DOMA.

Figure 6:
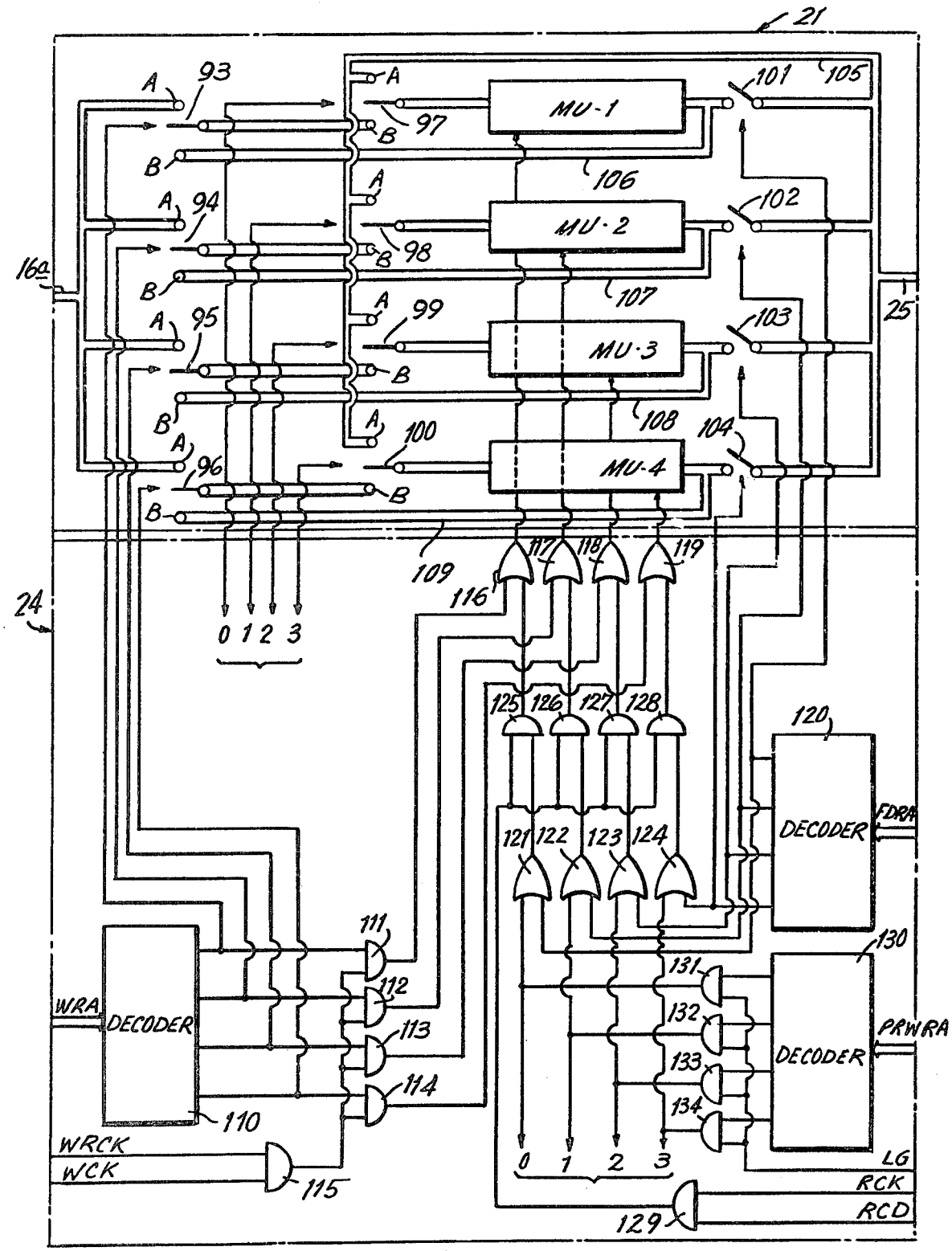
FIG. 6 is a schematic block diagram illustrating details of a main memory and a main memory control included in the time base corrector of FIG. 1.

The system control 23 of FIG. 5 is further shown to comprise a counter 71 which receives the read clock pulses RCK from read clock generator 27, and the read start pulses RST (FIG. 11A) from generator 26. The counter 71 counts 640 read clock pulses RCK after its counting operation has been initiated by each read start pulse RST. The output (FIG. 11B) of counter 71 is at a high level "1" to constitute a read command RCD during each counting operation, and the output of counter 71 is at a relatively low or "0" level during the intervals between counting operations. Such read command RCD is applied to the main memory control 24 (FIGS. 1 and 6). Further, each output or read command RCD from counter 71 is applied to a monostable multivibrator (MM) 72 which is triggered by the falling edge of the read command RCD to provide an output or pulse (FIG. 11D). The falling edges of the outputs or pulses from MM 72 are counted by a two-bit binary counter 73 which provides a two-bit binary output constituting a read control signal or address RA (FIG. 11E) for selecting the memory unit of main memory 21 from which the stored digitized video information is to be read or fetched.

The write address WRA from counter 66 and the read address RA from counter 73 are applied to a digital comparator 74 and the latter is made operative by the high level output or pulse (FIG. 11D) from MM 72, that is, immediately following the completion of a reading operation, to compare the write address WRA and the read address RA then being supplied to comparator 74 and, on the basis of such comparison, to further control or step the counter 73 for affecting the read address RA issuing therefrom as hereinafter described.

Normally, the write address WRA and the read address RA are changed by sequencing of counters 66 and 73, respectively, so as to address the memory units of main memory 21 in the repeating cyclic order MU-1, MU-2, MU-3, MU-r, MU-1—etc., and further to provide an inoperative memory unit, that is, a memory unit which is neither writing nor reading, between the memory units in the foregoing repeating cyclic order which are addressed by write address WRA and read address RA for writing and reading operations, respectively, in response to a write command WCD and the more or less overlapping read command RCD. Thus, as previously mentioned with reference to FIG. 3, during the writing in a selected one of the memory units MU-1, MU-2, MU-3 and MU-4 identified by the write address WRA, the read address RA normally selects and causes reading from the memory unit MU-3, MU-4, MU-1 or MU-2, respectively. However, in correcting for excessive time base errors in the incoming video signals, the normal sequencing of counters 66 and 73 may cause the read address RA and the write address WRA to identify the same memory unit during overlapping portions of the read and write commands RCD and WCD. In such case, the apparatus would seek to effect simultaneous writing and reading operations in the same memory unit at the different clocking rates established by the write clock pulses WRCK and the read clock pulses RCK, which is obviously not possible.

In order to avoid the foregoing, digital comparator 74 in the system control 23 provides a suitable control output to counter 73 for aborting or preventing the normal sequencing of counter 73 at the falling edge of the output or pulse from MM 72 during which the write and read addresses WRA and RA are being compared, whenever such comparison indicated that the normal sequencing of counter 73 at the falling edge of the output from MM 72 would result in the new read address RA' then being the same as the write address WRA which has been compared. On the other hand, if the comparison of the write and read addressing during an output from MM 72 indicates that the normal sequencing of counter 73 at the falling edge of such output would provide a new read address RA' that is only one address in advance of the compared write address WRA so that the sequencing of counter 66 by the falling edge of the next output from MM 65 would result in the write and read addresses then being the same, then the digital comparator 74 provides a suitable control output or signal to counter 73 for an additional sequencing of the latter in advance of the normal sequencing thereof at the falling edge of the output from MM 72 during which the addresses are compared.

Thus, if for example, during an output from MM 72, the read address RA representing memory unit MU-1 is compared with a write address WRA representing the memory unit MU-3 or MU-4, no control output is applied from comparator 74 to counter 73 as the normal sequencing of counter 73 at the falling edge of such output from MM 72 will result in a new read address RA' representing memory unit MU-2 and the sequencing of counter 66 at the falling edge of the next output from MM 65 will result in a write address WRA representing either memory unit MU-4 or MU-1, respectively, which are different from the memory unit MU-2 represented by the read address RA'. From the foregoing, it will be seen that no control output issues from comparator 74 to counter 73 so long as there is no possibility that the read and write addresses RA and WRA will select the same memory unit in the interval between an output from MM 72 and the next output from the latter.

However, if, during an output from MM 72, the read address representing, for example, the memory unit MU-1, is compared with the write address representing the same memory unit MU-1, the comparator 74 provides a control output or signal which sequences counter 73 in advance of the normal sequencing thereof at the falling edge of the output from MM 72 with the result that counter 73 is sequenced or stepped twice to issue the new read address RA' corresponding to memory unit MU-3. Therefore, if, during the reading of memory unit MU-3 an output from MM 65 causes counter 66 to provide the write address WRA for memory unit MU-2, there is no danger of double clocking of a single memory unit, that is, the simultaneous writing and reading of a single memory unit. On the other hand, if the read address RA and the write address WRA which are compared by comparator 74 during an output from MM 72 respectively represent memory units MU-1 and MU-2, the resulting control output from comparator 74 will abort or prevent the normal sequencing of counter 73 at the falling edge of such output from MM 72 so that the new read address RA' will be the same as the compared read address RA and the memory unit MU-1 will be read again during the next read command RCD. Thus, whether or not counter 66 is sequenced during the repeated reading of memory unit MU-1, there is no danger of writing in memory unit MU-1 during the reading therefrom.

The system control 23 is further shown to comprise a digital adder 75 which adds −1 to the read address RA from counter 73 to provide an output or address (RA−1). Thus, if read address RA corresponds to memory unit MU-1, the address (RA−1) from adder 75 will correspond to memory unit MU-4. Such output or address (RA−1) from adder 75 is compared, in a digital comparator 76, with the write address WRA from counter 66. The comparator 76 provides an output of high level "1" if the compared addresses (RA−1) and WRA correspond to the same memory unit, and the output of comparator 76 has a low value "0" when the compared addresses (RA−1) and WRA correspond to different memory units. Such output from comparator 76, that is, the result of the comparison of addresses WRA and (RA−1), is stored in a D-type flip-flop (FF) 77 which is triggered, as indicated on FIG. 11F, at the rising edge of each output (FIG. 11D) from MM 72, that is, before the comparator 74 may effect any change in the read address RA from counter 73 and also before the normal sequencing of counter 73 by the falling edge of the output from MM 72. The read address RA from counter 73 is further shown to be applied to a second digital adder 78 which adds +1 to the read address RA and, therefore, provides an output or address (RA+1). The outputs or addresses (RA+1) and (RA−1) from adders 78 and 75, respectively are applied to fixed contacts A and B, respectively, of a switch 79 which has its movable contact controlled by the output (FIG. 11F) of FF 77 to engage contact A and pass address (RA+1) as a spare read address SRA only when the output of comparator 76 and hence of FF 77 is at the high level "1", and otherwise, that is, when the output of FF 77 is at the low level "0", to engage the contact B for passing the address (RA−1) as the spare read address SRA.

The output of MM 72 is further shown to be applied to a monostable multivibrator (MM) 80 which, as shown on FIG. 11G, is triggered by the falling edge of the output or pulse from MM 72 to provide a pulse which, at the falling edge of the latter, triggers a flip-flop (FF) 81 and a monostable multivibrator (MM) 82. The output of MM 82 is applied to monostable multivibrators (MM) 83 and 84, which, as shown on FIG. 11L and FIG. 11J, respectively, are both triggered by the falling edge of the output or pulse from MM 82. The falling edge of the output or pulse (FIG. 11L) from MM 83 triggers a flip-flop (FF) 85. As hereinafter described in detail, the drop-out memory 35 provides drop-out information DOI which is applied to FF 81 and FF 85 so that the FFs 81 and 85 respectively store the drop-out information provided by memory 35 at the times when FF 81 and FF 85 are respectively triggered by the falling edges of the pulses from MM 80 and MM 83.

The output or pulse (FIG. 11J) from MM 84 controls a switch 86 having a fixed contact A which receives the spare read address SRA, that is, the address (RA−1) or (RA+1), from switch 79, and a fixed contact B which receives the address RA from counter 73. During the output or pulse (FIG. 11J) from MM 84, the movable contact of switch 86 is changed-over to engage the fixed contact A thereof so that the spare read address SRA is passed thereby to the drop-out memory 35 so that the drop-out information DOI from the latter then indicates whether there was any drop-out in the video information received while writing in the memory unit identified by the spare read address SRA. In the intervals between the output or pulse from MM 84, switch 86 engages its fixed contact B so as to pass the read address RA from counter 73 to drop-out memory 35 with the result that the drop-out information DOI then indicates whether any drop-out appeared in the video information received while writing in the memory unit identified by the read address RA.

Assuming that the read addresses provided by counter 73 for successive reading intervals or periods are RA, RA', RA"—etc., it will be seen from the respective waveforms on FIG. 11 that the falling edge of each output or pulse from MM 80 for triggering FF 81 occurs after the respective sequencing of counter 73 for changing the read address from RA to RA', or from RA' to RA", but before the output or pulse from MM 84 so that FF 81 is triggered while switch 86 engages its B contact to pass the read address RA', RA"—etc. to drop-out memory 35. Therefore, in each instance, FF 81 is triggered prior to a read interval to store the drop-out information DOI relative to the memory unit identified by the read address RA', RA",—etc. and from which the video information would normally be read in the next read interval or period. Further, it will be seen that the falling edge of the output or pulse from MM 83 for triggering FF 85 occurs during the output or pulse from MM 84, that is, while switch 86 engages its A contact to pass the spare read address SRA', SRA",—etc. to drop-out memory 35. Therefore, in each instance, FF 85 stores the drop-out information DOI relative to the memory unit identified by the spare read address SRA', SRA"—etc.

Since the triggering of FF 85 occurs after the falling edge of the output from MM 72, that is, after the sequencing of counter 73, it will be apparent that the spare read address SRA' is either (RA'−1) or (RA'+1) and the spare read address SRA" is either (RA"−1) or (RA"+1), with the read addresses RA' and RA" identifying, as mentioned above, memory units from which video information would normally be read in the following read intervals or periods. However, since FF 77 is triggered by the rising edge of the output or pulse from MM 72, that is, before the sequencing of counter 73, the determination of whether, for example, SRA' is (RA'−1) or (RA'+1) is made on the basis of a comparison of WRA and (RA−1) in which RA is the address indicated by counter 73 prior to its being sequenced.

Each of the FFs 81 and 85 provides a high level output "1" only when the drop-out information DOI stored therein indicates that drop-out appeared in the incoming video information during writing in the memory unit identified by the read address RA', RA",—etc., or by the spare read address SRA',SRA",—etc., respectively, and at all other times the FFs 81 and 85 each provide a low level output "0".

The output of FF 81 is shown to be employed for controlling switches 87 and 88 each having fixed contacts A and B which are engaged by a respective movable contact when the output of FF 81 is at its high level "1" and at its low level "1", respectively. Further, the fixed contacts A and B of switches 87 and 88, respectively, are connected to switch 79 for receiving the spare read address SRA, SRA', SRA",—etc. from the latter, while the fixed contacts B and A of switches 87 and 88, respectively, are connected to counter 73 for receiving the read address RA, RA',RA",—etc. from the latter. Therefore, when the output of FF 81 is at its low level "0", indicating no drop-out in the incoming video information during writing in the memory unit identified by read address RA′,RA″,—etc., the switch 87 delivers the respective read address from counter 73 to the main memory control 24 as a finally determined read address FDRA, while the switch 88 delivers the spare read address SRA′,SRA″,—etc. from switch 79 to main memory control 24 as a possible rewrite address PRWRA. On the other hand, when the output of FF 81 is at its high level "1" indicating a drop-out in the incoming video information during writing in the memory unit identified by read address RA′,RA″, —etc. from counter 73, the switches 87 and 88 respectively deliver the addresses SRA′ and RA′, SRA″ and RA″λ ,—etc. as the FDRA and the PRWRA, respectively. Further, as shown on FIG. 5, the address PRWRA obtained through switch 88 is also applied to fixed contact B of switch 70. Therefore, when the output of MM 64 is at its low level "0", the address PRWRA from switch 88 is transmitted through switch 70 to the drop-out memory 35.

It will also be seen on FIG. 5 that the outputs from FF 81 and FF 85 (FIGS. 11I and 11M) are applied to a logic circuit 89 which provides a logic output LG at a high level "1" whenever the outputs of FFs 81 and 85 are different, for example, "0" and "1" or "1" and "0", respectively; whereas, the logic output LG is at a low level "0" whenever the outputs of FFs 81 and 85 are the same, for example, "0" and "0" or "1" and "1", respectively.

The logic output LG is employed for controlling a switch 90 in system control 23, and is also applied to main memory control 24 and velocity error memory 32 for purposes that will appear from the following detailed descriptions of the latter components. The switch 90 is open so long as the logic output LG is at the low level "0" and is closed in response to the logic output LG attaining the high level "1". Further, a monostable multivibrator (MM) 91 is triggered by each read start pulse RST to provide an output or pulse (FIG. 11N) which is passed through switch 90, upon closing of the latter, to a fixed contact B of a switch 92 which further has a fixed contact A connected to the output of MM 63. The switch 92 is controlled by the output of MM 64 (FIG. 10K) so that a movable contact of switch 92 normally engages its fixed contact B and is changed-over to its fixed contact A only during the high level output or pulse from MM 64.

It will be seen from the above that, during the output or pulse from MM 64, that is, when switches 70 and 92 are changed over to engage their respective contacts A, the output or pulse from MM 63 is passed through switch 92 to the drop-out memory 35 as a drop-out write command DOWCD for the latter, while switch 70 passes the write address WRA to the drop-out memory 35 as the drop-out memory address DOMA at which the sensed drop-out SDO, if it then exists, is to be written or stored in drop-out memory 35, as hereinafter described in detail. On the other hand, in the intervals between successive outputs or pulses from MM 64, that is, when switches 70 and 92 engage their B contacts, if the logic output LG from logic circuit 89 is at the high level "1" for closing switch 90, the pulse from MM 91 triggered by read start pulse RST is passed through switch 92 to drop-out memory 35 as an erase command so as to cause erasing, at the falling edge of the pulse from MM 91, of the sensed drop-out that may have been previously written at the address in drop-out memory 35 indicated by the address PRWRA passed from switch 88 through switch 70 to the drop-out memory.

MAIN MEMORY

Referring now to FIG. 6, it will be seen that, in the main memory 21, the digitized video information from A/D converter 16 is applied, by way of bus 16a, to fixed contacts A of switches 93, 94, 95 and 96 which are respectively associated with memory units MU-1, MU-2, MU-3 and MU-4. The movable contacts of switches 93, 94, 95 and 96 are connected to fixed contacts B of switches 98, 98, 99 and 100, respectively, which, in turn, have their movable contacts connected to the inputs of memory units MU-1, MU-2, MU-3 and MU-4, respectively. The outputs of memory units MU-1, MU-2, MU-3 and MU-4 are connected by way of normally open switches 101, 102, 103 and 104, respectively, to the bus 25, and the video information read out of any one of the memory units is fed back, by way of a rewriting loop 105, from bus 25 to fixed contacts A of all of the switches 97–100. Further, individual feedback loops 106, 107, 108 and 109 extend to fixed contacts B of switches 93, 95, 95 and 96, respectively, from the outputs of memory units MU-1, MU-2, MU-3 and MU-4 in advance of the respective switches 101, 102, 103 and 104. The movable contacts of switches 93–96 and of switches 97–100 normally engage the respective fixed contacts B and are changed-over to engage the respective fixed contacts A only when such switches receive respective control voltages or signals, as hereinafter described in detail.

MAIN MEMORY CONTROL

In the main memory control 24, as shown on FIG. 6, a decoder 110 receives the write address WRA from counter 66 in system control 23 and provides a suitable control output or signal to a selected one of the switches 93–96 which is associated with the memory unit identified by the write address WRA received by the decoder 110, so as to change-over the selected one of switches 93–96 to its contact A. Further, the control output or signal issuing from decoder 110 in response to the write address WRA is applied to a respective one of four AND gates 111, 112, 113 and 114 for opening the one of such gates associated with the memory unit identified by the write address WRA. An AND gate 115 receives the write clock pulses WRCK from the write clock generator 20 and the write command WCD from the counter 62 of system control 23 so that AND gate 115 is opened by the write command WCD for passing the write clock pulses WRCK to all of the AND gates 111–114. The outputs of AND gates 111, 112, 113 and 114 are respectively connected to OR gates 116, 117, 118 and 119 which, in turn, have their outputs suitably connected to memory units MU-1, MU-2, MU-3 and MU-4, respectively.

It will be apparent from the above that, upon the reception of a write command WCD by AND gate 115 the write clock pulses WRCK are applied through a selected one of AND gates 111–114, as determined by the write address WRA received by decoder 110, and through a respective one of OR gates 116–119 to the one of memory units MU-1—MU-4 identified by the write address WRA, while the decoder 110 simultaneously causes the change-over of the respective one of the switches 93–96. Thus, the digitized video information received by bus 16a is applied through the changed-over one of the switches 93–96 and through the respective one of the switches 97–100 to the input of the memory unit identified or selected by the write address WRA so as to be written in such selected memory unit at the clocking rate determined by the write clock pulses WRCK.

The main memory control 24 is further shown to comprise a decoder 120 which receives the finally determined read address FDRA from switch 87 of system control 23, and which provides a suitable control output or signal for closing a selected one of the switches 101–104 which is associated with the memory unit identified by the finally determined read address FDRA. The outputs of decoder 120 corresponding to memory units MU-1, MU-2, MU-3 or MU-4 are also respectively connected to inputs of OR gates 121, 122, 123 and 124 having their outputs connected to inputs of AND gates 125, 126, 127 and 128, respectively. Other inputs of AND gates 125–128 are all connected to the output of an AND gate 129 which receives read clock pulses RCK from read clock generator 27 and read command RCD from counter 71 of system control 23. Further, the outputs of AND gates 125–128 are connected to inputs of OR gates 116–119, respectively.

It will be apparent from the above that, when the read command RCD is received to open AND gate 129, the read clock pulses RCK are passed through gate 129 and through a selected one of the AND gates 125–128 which has been opened by an output signal transmitted by way of the respective one of the OR gates 121–124 from decoder 120 in response to the received finally determined read address FDRA. The read clock pulses RCK passed through a selected one of the AND gates 125–128 are transmitted through the respective one of the OR gates 116–119 to the one of the memory units MU-1—MU-4 which has had its respective switch 101–104 closed in response to the output signal from decoder 120. Thus, the digitized video information previously stored in the selected one of the memory units identified by the finally determined read address FDRA is read out or fetched from such memory unit to the bus 25 in response to the read command RCD and at a clocking rate determined by the read clock pulses RCK. It will also be seen that, during the read out of stored video information from any one of the memory units MU-1—MU-4, the read-out information is fed back to the input of the same memory unit by way of the respective one of the feedback loops 106–109, the respective one of the switches 93–96 then engaged with its contact B and the respective one of the switches 97–100 also then engaged with its contact B.

The main memory control 24 is further shown to comprise a decoder 130 which receives the possible rewrite address PRWRA from switch 88 of system control 23, and which is operative to provide a control signal or output to an input of a selected one of four AND gates 131, 132, 133, and 134 which have their outputs connected to OR gates 121, 122, 123 and 124, respectively. The outputs of AND gates 131, 132, 133 and 134 are also connected, as indicated at 0, 1, 2 and 3, to the switches 97, 98, 99 and 100, respectively, for operating the latter. Finally, the logic output LG from logic circuit 89 of system control 23 is connected to other inputs of AND gates 131–134.

It will be apparent from the above, that, when the logic output LG is at its high level "1", such high logic output is passed through a selected one of AND gates 131–134 which corresponds to the possible rewrite address PRWRA received by decoder 130 and which has been closed by the corresponding control signal or output from such decoder, to a respective one of the switches 97–100 for changing-over that respective switch to its contact A. Simultaneously, the high level "1" of logic output LG passing through the opened one of AND gates 131–134 is further passed through the respective one of OR gates 121–124 for opening the respective one of AND gates 125–128. Accordingly, the read clock pulses RCK are passed through AND gate 129 opened by read command RCD and through the selected one of AND gates 125–128 opened by the high level logic output LG for passing through the respective one of OR gates 116–119 to the memory unit corresponding to the possible rewrite address PRWRA. Therefore, when the logic output LG is at its high level "1", the digitized video information being read out of a selected one of memory units MU-1—MU-4 corresponding to the finally determined read address FDRA applied to decoder 120 is fed back through rewrite loop 105 and rewritten in the memory unit which is identified by the possible rewrite address PRWRA applied to decoder 130.

DROP-OUT MEMORY

Referring now to FIG. 7, it will be seen that the drop-out memory 35 of the time base corrector 10 according to this invention may comprise four D-type flip-flops (FF) 135, 136, 137 and 138 which respectively correspond to memory units MU-1, MU-2, MU-3 and MU-4. A decoder 139 receives the drop-out memory address DOMA from switch 70 of system control 23 so as to provide a control signal or output for opening a selected one of four AND gates 140, 141, 142 and 143 which are associated with FFs 135, 136, 137 and 138, respectively. The drop-out write command DOWCD from switch 92 of system control 23, that is, the output or pulse from MM 63 passed through switch 92 when the latter is made to engage its contact A by the pulse from MM 64, is applied to inputs of all of the AND gates 140–143. Therefore, a selected one of the FFs 135–138 provides an output of high level "1" when a sensed drop-out SDO is stored therein, while the output from each of the FFs 135–138 is at a relatively low level respective opened one of AND gates 140–143, so that the triggered one of the FFs 135–138 is adapted to store the sensed drop-out signal SDO which may then be received from switch 69 of system control 23 and which is applied to all of the FFs 135–138. Each of FFs 135–138 provides an output of high level "1" when a sensed drop-out SDO is stored therein, while the output from each of the FFs 135–138 is at a relatively low level "0" in the absence of a sensed drop-out SDO stored therein. The outputs of FFs 135–138 are adapted to be applied through normally open switches 144, 145, 146 and 147, respectively, to a common line 148 for transmitting drop-out indications DOI to FFs 81 and 85 of system control 23. Drop-out memory 35 further includes a decoder 149 which receives the read address RA and then the spare read address SRA from switch 86 of system control 23 and is operative to provide a control signal or output for closing a selected one of the switches 144–147 associated with the one of FFs 135–138 corresponding to the memory unit identified by each address received by decoder 149.

It will be noted that, in drop-out memory 35, AND gates 140–143 which are selectively opened by control signals or outputs from decoder 139 to pass the drop-out write command DOWCD, could be replaced by normally open switches which are selectively closed by the control signals or outputs from decoder 139. Further, the normally open switches 144–147 which are selectively closed by control signals or outputs from decoder 149 could be replaced by AND gates which are selectively opened by the control signals from decoder 149.

It will be apparent that, in the drop-out memory 35 as described above, the drop-out memory address DOMA applied from switch 70 of system control 23 to decoder 139 during the pulse or output from MM 64 is the write address WRA applied from counter 66 to contact A of switch 70, while the drop-out write command DOWCD then applied to drop-out memory 35 is the pulse or output from MM 63 applied to contact A of switch 92. Thus, during each writing operation of main memory 21, the sensed drop-out SDO, if it exists, is stored in the one of FFs 135–138 which corresponds to the memory unit identified by the write address WRA and in which the digitized video information is being written.

In a reading operation of main memory 21, and assuming that the logic output LG from logic circuit 89 is at its low level "0", the read address RA' corresponding to the memory unit from which the video information is to be read or fetched is first applied from switch 86 to decoder 149 so that the latter causes the drop-out information DOI to be transmitted from the respective one of FFs 135–138 to FF 81 of system control 23, whereby the output of FF 81 indicates whether or not drop-out occurs in the video information stored in the memory unit identified by read address RA'. Further, in the reading operation, during the interval of the pulse from MM 84, switch 86 is changed-over to its contact A to supply the spare read address SRA' to decoder 149 with the result that the drop-out information DOI then transmitted to FF 85 indicates whether or not drop-out occurred in the video information stored in the memory unit identified by the spare read address SRA'. In the reading operation, switch 70 remains engaged with its contact B so that the address supplied through switch 70 to decoder 139 of drop-out memory 35 is the possible rewrite address PRWRA obtained from switch 88, that is, the address RA' if FF 81 indicates drop-out in the memory unit corresponding to that address, or the address SRA' if FF 81 indicates that the memory unit identified by the address RA' is free of drop-out. Furthermore, if the logic output LG of logic circuit 89 is at the high level "1" indicating drop-out in the memory unit identified by the address RA' or the address SRA', switch 90 is closed and the output or pulse from MM 91 is passed therethrough to contact B of switch 92. Since switch 92 engages its contact B during the reading operation, the pulse from MM 91 is passed through switch 92 as an erase command, in place of the drop-out write command DOWCD, to all of the FFs 140–143. The more command is further passed through the one of FFs 140–143 which is opened by a control signal from decoder 139 in response to the possible rewrite address PRWRA then applied to decoder 139, whereby the described erase command triggers or resets the one of the FFs 135–138 corresponding to the possible rewrite address PRWRA for erasing any drop-out information previously stored in such flip-flop.

VELOCITY ERROR MEMORY

Referring again to FIG. 4, it will be seen that, in the velocity error memory 32 of time base corrector 10 according to this invention, the velocity error held in circuit 33 is applied to a fixed contact B of a switch 150 having a movable contact that normally engages such contact B for supplying the velocity error to a buffer amplifier 151. The switch 150 is changed-over to engage a fixed contact A thereof only during the rewriting, in a memory unit identified by the possible rewrite address PRWRA, of the video information being read out of a memory unit identified by the finally determined read address FDRA, as described above with reference to FIG. 6. More particularly, a normally open switch 152 is closed in response to the high level "1" of logic output LG from logic circuit 89 so that the read start pulse RST (FIG. 9O) is applied through closed switch 152 for triggering a monostable multivibrator (MM) 153. When triggered by read start pulse RST, MM 153 provides an output of relatively high level "1" for about 20 microseconds (FIG. 9T), and such high level output of MM 153 is applied to switch 150 for changing-over the latter to its contact A. The output of MM 153 is further applied to a switch 154 having a movable contact which normally engages a fixed contact B receiving the output of a digital adder 155 which adds (−1) to the write address WRA from counter 66 of system control 23, that is, adder 155 provides the address (WRA-1). The switch 154 further has a fixed contact A receiving the possible rewrite address PRWRA from switch 88 of system control 23 and which is engaged by the movable contact of switch 154 in response to the relatively high level output of MM 153. The movable contact of switch 154 is connected to a decoder 156 which normally receives the address (WRA-1) from contact D of switch 154, whereas decoder 156 receives the possible rewrite address PRWRA from contact A of switch 154 when the latter is changed-over by the output of MM 153 in response to the high level of logic output LG.

Figure 9:
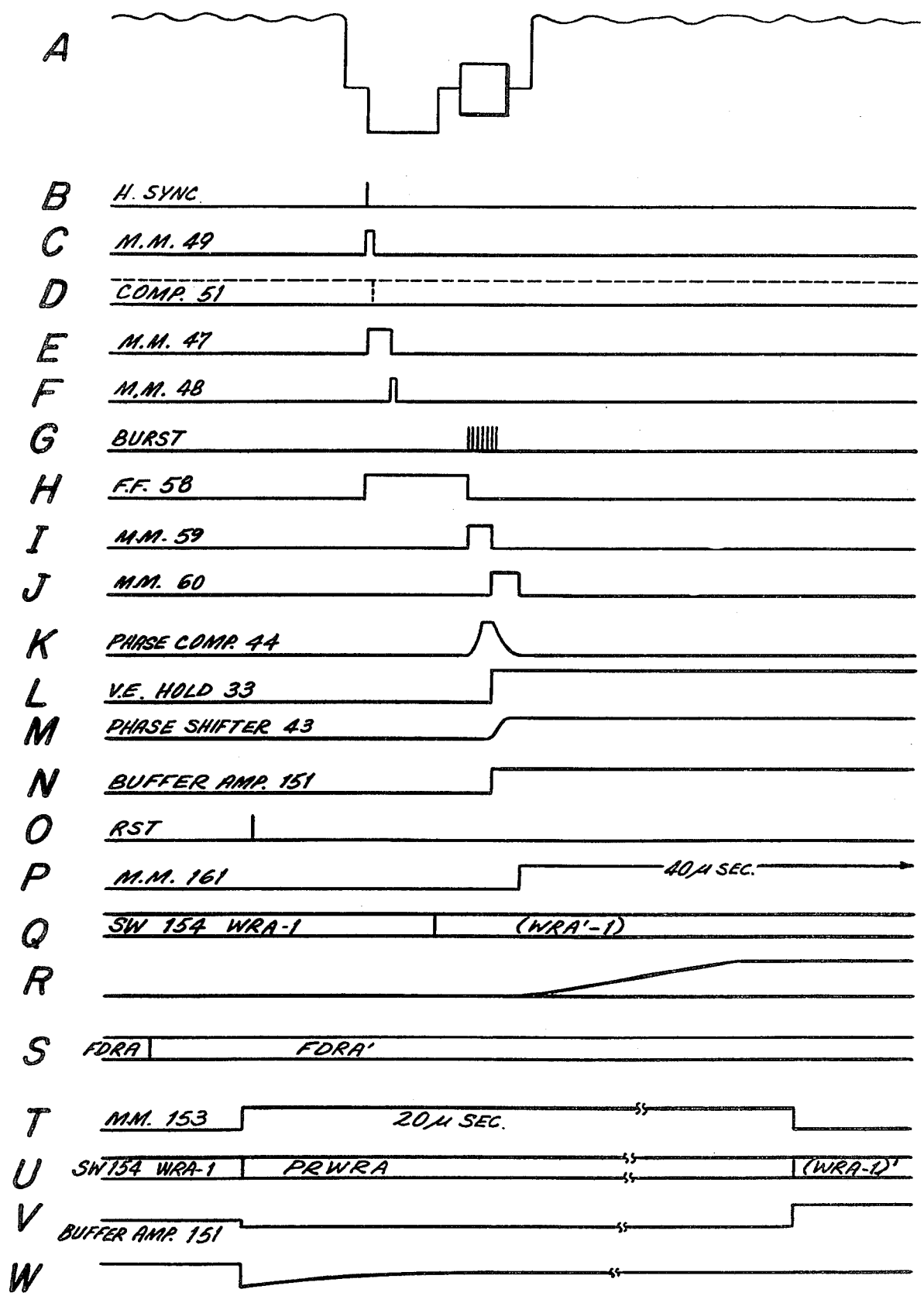
FIGS. 9A-W are waveforms to which reference will be made in explaining the operation of the write clock generator and the velocity error memory of FIG. 4.

During a normal writing operation of main memory 21 for writing digitized video information successively in the memory units thereof identified by write addresses WRA,WRA'—etc., switch 154 delivers the addresses (WRA-1),(WRA'-1),—etc. to decoder 156 (FIG. 9Q). Thus, for example, during the writing in the memory unit identified by address WRA, decoder 156 applies a suitable control signal or output to the one of four AND gates 157, 158, 159 and 160 which corresponds to the address (WRA-1), that is, to the memory unit in which video information was written during the preceding writing interval or operation. The falling edge of the output or pulse (FIG. 9J) from MM 60 in write clock generator 20 is employed to trigger a monostable multivibrator (MM) 161 which produces a pulse of 40 microseconds duration (FIG. 9P) applied through an OR gate 162 to all of the AND gates 157–160. Thus, during the existence of the output from MM 161, the control output or signal from decoder 156 can pass through the one of AND gates 157–160 corresponding to the memory unit identified by the address (WRA-1) and can close a respective one of four normally open switches 163, 164, 165 and 166. Upon closing of a selected one of switches 163–166, the velocity error held in circuit 33 and which relates to the velocity error occurring during a preceding writing interval, that is, the interval of writing in the memory unit identified by address (WRA-1), is applied through switch 150, buffer amplifier 151 (FIG. 9N) and the closed one of switches 163–166 to a respective one of four analog memories 167, 168, 169 and 170, which are shown as grounded capacitors connected to respective buffer amplifiers 171, 172, 173 and 174 having high input impedances. Thus, during the writing of digital video information in the memory units MU-1—MU-4 of main memory 21, the velocity error information held in circuit 23 (FIG. 9L) in respect to the writing in each such main memory unit, is stored in the next writing interval in a respective one of analog memories 167–170. The storage of velocity error information is in the form of a build-up of potential (FIG. 9R) to a corresponding level on the capacitor selected by the closing of one of switches 163–166.

In order to provide for the read out of the stored velocity error information during the normal reading operation of main memory 21, the finally determined read address FDRA is applied from switch 87 of system control 23 to a decoder 175 in velocity error memory 32. Decoder 175 is operative to provide control signals or outputs for selectively closing normally open switches 176, 177, 178 and 179 interposed between the outputs of buffer amplifiers 171, 172, 173 and 174, respectively, and a common line 180 for applying the read out velocity error information to the read clock generator 27. It will be apparent that, during the reading of the digital video information successively from the memory units of main memory 21 identified by the finally determined read address FDRA, FDRA'—etc. (FIG. 9S), decoder 175 causes closing of a selected one of switches 176–179 during each reading interval or period for applying to the common line 180 the stored velocity error information from the one of analog memories 167–170 corresponding to the main memory unit from which video information is being read.

When the logic output LG from logic circuit 89 is at its high level "1" so as to cause the rewriting in the memory unit identified by the possible rewrite address PRWRA of the digital video information being read out from the memory unit identified by the finally determined read address FDRA', such high level logic output LG closes switch 152 so that read start pulse RST can trigger MM 153, whereupon the output (FIG. 9T) from the latter changes-over switches 150 and 154 to engage their respective contacts A. Upon engagement of switch 150 with its contact A, the velocity error VE being read out of the one of analog memories 167–170 which corresponds with the memory unit identified by the finally determined read address FDRA' is applied through switch 150 to buffer amplifier 151 (FIG. 9V). The engagement of switch 154 with its contact A causes the possible rewrite address PRWRA to be applied to decoder 156 so that the latter applies a control signal or output to the one of AND gates 157–160 corresponding to such address. Since the output of MM 153 is applied through OR gate 162 to all of AND gates 157–160, such output from MM 153 passes through the one of AND gates 157–160 receiving a control signal or output from decoder 156 so as to cause closing of the respective one of switches 163–166. Therefore, the output of buffer amplifier 151 is applied through the closed one of switches 163–166 for storage in the respective one of analog memories 160–170 corresponding to the main memory unit which is identified by the possible rewrite address PRWRA.

It will be apparent from the above that, during the rewrite in the memory unit identified by the address PRWRA of the digitized video information being read out of the memory unit identified by the address FDRA', the velocity error being read out of the analog memory corresponding to the address FDRA' is simultaneously rewritten in the analog memory identifed by the address PRWRA. Thus, during subsequent reading of the video information that has been rewritten in a memory unit of main memory 21, the velocity error memory 32 will simultaneously provide a velocity error corresponding to that which existed during the original writing of the rewritten video information.

READ CLOCK GENERATOR

Referring now to FIG. 8, it will be seen that the read clock generator 28 of the time base corrector 10 according to this invention may include a sawtooth generator 181 which receives the velocity error signal VE from the output line 180 of velocity error memory 32. Further, the read command RCD from counter 71 of system control 23 is applied to an inverter 182 having its output connected to sawtooth generator 181 so that the output of the latter remains zero during the time when the output of inverter 182 is at a high level "1", that is, in the intervals between successive read commands RCD. A sub-carrier signal SC, for example, having the frequency 3.58 MHz in the case of the processing of NTSC color video signals, is applied from the standard sync generator 26 to a phase modulator 183 for phase modulation in the latter by the output of sawtooth generator 181. Since the inclination of the sawtooth wave forming the output of generator 181 is proportional to the potential of the velocity error signal VE received by generator 181 from velocity error memory 32, the output of modulator 183 is the subcarrier signal phase modulated by the velocity error signal. The phase modulated subcarrier signal is applied to a monostable multivibrator 184 which produces a correspondingly phase modulated square wave signal and the harmonics thereof. The output of MM 184 is applied to a band pass filter 185 which is tuned to the third harmonic of the subcarrier signal SC so that the phase modulated output of band pass filter 185 has a frequency of, for example, 10.74 MHz. Finally, the output of band pass filter 185 is supplied through an amplifier 186 to a square-wave former 187 to provide the desired read clock pulse RCK modulated by the velocity error and which, as previously noted, determine the clocking rate at which the digitized video information is read out of main memory 21.

Having described the general arrangement of the various components of the time base corrector 10 according to this invention and the details of such components, it will be noted that, in such time base corrector, the control of the sequencing of the counter 73 by the digital comparator 74 ensures that, during each reading interval, the memory unit of main memory 21 identified by the read address RA from counter 73, and hence from which video information is being read, will be different from the memory unit identified by the write address WRA, and hence in which the video information is being written, whereby to avoid the so-called double clocking of any one of the memory units. Further, in the time base corrector 10, a drop-out indication DIO is provided whenever a drop-out occurs in the video information being written in any one of the memory units of the main memory 21 and such drop-out indication is stored in the drop-out memory 35 in respect to each of the main memory units. Upon reading out of the video information stored in the successive memory units of main memory 21, the system control 23 causes reading of the video information either from the memory unit identified by the read address RA provided by counter 73 or, in the event that the drop-out memory 35 indicates that there is drop-out in the video information stored in such memory unit at the read address RA, then from another memory unit identified by the spare read address SRA. Thus, actual reading is effected in respect to the memory unit identified by the finally determined read address FDRA. In determining the spare read address SRA as being either RA-1 or RA+1, the digital comparator 76 and FF 77 of system control 23 ensure that such spare read address SRA, if it becomes the finally determined read address FDRA, will not result in double clocking of the respective memory unit, that is, the write address WRA and the finally determined read address FDRA will not be the same to cause overlapping writing and reading operations in respect to the same memory unit.

Furthermore, in time base corrector 10 according to this invention, if it is determined that drop-out exists in the memory unit identified by read address RA so that the finally determined read address FDRA is the spare read address SRA, then the video information being read out of the memory unit identified by the address SRA is rewritten in the memory unit having dropout, that is the memory unit identified by the read address RA which then becomes the possible rewrite address PRWRA. Conversely, if it is determined that drop-out exists in the memory unit identified by the spare read address SRA, but not in the memory unit identifed by the address RA, then video information is actually read out of the memory unit identified by the address RA and is rewritten in the memory unit identified by the address SRA. In connection with the foregoing rewriting, or replacing of video information containing drop-out by video information free of drop-out, it will be noted that the drop-out memory 35 is effective to erase the drop-out indication in respect to the memory unit in which the rewriting operation is being performed.

It will be further apparent that, in time base corrector 10 according to this invention, velocity error memory 32 memorizes the velocity errors occurring during the writing of video information in each of the memory units of main memory 21, and each such velocity error is employed in read clock generator 28 for phase modulating the read clock pulses RCK which determine the clocking rate on reading the video information from the respective one of the memory units. Moreover, when video information from a memory unit at address FDRA is rewritten in a memory unit at address PRWRA, as described above, the velocity error memory 32 is effective to store, in respect to such memory unit PRWRA, the velocity error associated with the original writing of the video information in the memory unit at the address FDRA. Thus, the phase modulation of the read clock pulses RCK will always correspond to the velocity errors occurring during the writing of the video information which is being read from a selected one of the memory units, whether such video information was originally written in that memory unit or rewritten in the latter so as to replace originally written video information containing drop-out.

Although a specific embodiment of the invention has been described herein with reference to the accompanying drawings, it is to be noted that the invention is not limited to that precise embodiment, and that various changes and modifications may be effected therein by one skilled in the art without departing from the scope or spirit of the invention as defined in the appended claims.

What is claimed is:

1. A time base corrector for removing time base errors from video signals comprising: main memory means including a plurality of memory units each having a capacity sufficient to store a predetermined whole number of line intervals of the video signals; input means for receiving the video signals; write clock generating means coupled to said input means for generating write clock pulses at a variable rate dependent upon time base errors in the incoming video signals; read clock generating means for generating read clock pulses at a rate which is standard at least at the beginning and end of each standard line interval of the video signals; main memory control means for selectively enabling said memory units to write therein the video signals received from said input means at a clocking rate determined by said write clock pulses, and for selectively enabling said memory units to read out therefrom, at a clocking rate determined by said read clock pulses, the video signals written in said memory units; output means for receiving the video signals selectively read out from said memory units; system control means including write addressing means generating write addresses of said memory units in a repeating cyclic order for causing said main memory control means to selectively enable said memory units in said repeating cyclic order for the writing therein of the video signals received from said input means, and read addressing means generating read addresses for causing said main memory control means to selectively enable the thereby read addressed memory units for the reading-out of the video signals stored therein, with each memory unit thus addressed for reading-out being different from the memory unit then addressed for writing; and velocity error memory means having a plurality of addresses respectively corresponding to said memory units and including means responsive to said write addressing means of the system control means for selectively writing, at said addresses, velocity error information in respect to velocity errors occurring in the video signals as written in the respective memory units, and means responsive to said read addressing means of the system control means for selectively reading-out the velocity error information from the address of said velocity error memory means which corresponds to the one of said memory units then enabled for said reading-out of the video signals therefrom; and in which said read clock generating means includes means for modulating said read clock pulses with the velocity error information being read-out from said velocity error memory means.

2. A time base corrector according to claim 1; in which said write clock generating means includes a variable frequency oscillator having an output with a center frequency which is a multiple of a color subcarrier frequency of said video signals, phase-locked loop means receiving said oscillator output and horizontal sync signals separated from the video signals received by said input means for varying the frequency of said oscillator output in accordance with variations in the frequency of said separated horizontal sync signals, variable phase shifting means, means for applying said oscillator output to said variable phase shifting means so as to obtain said write clock pulses at the output of said variable phase shifting means, phase comparator means for comparing the phase of said output from the variable phase shifting means with the phase of burst signals at said subcarrier frequency separated from said video signals received by said input means for providing a corresponding control signal to said variable phase shifting means; and further comprising means for applying said control signal from said phase comparator means to said velocity error memory means as said velocity error information to be written in the latter.

3. A time base corrector for removing time base errors from incoming video signals: comprising main memory means having a plurality of addresses for storing respective lines of said incoming video signals;

write clock generating means for generating write clock pulses at a variable rate dependent upon time base errors in said incoming video signals;

input circuit means for writing said incoming video signals into said main memory means at a rate determined by said write clock pulses;

read clock generating means for generating read clock pulses;

output circuit means for reading out the video signals from said main memory means in accordance with said read clock pulses;

control means for controlling the writing and reading of video signals into and out of said main memory means by said input circuit means and said output circuit means, respectively;

velocity error detecting means for detecting velocity errors in successive lines of said incoming video signals;

velocity error memory means having a plurality of addresses respectively corresponding to said addresses of the main memory means and in which there are stored detected velocity errors for the lines of video signals stored in the respective addresses of said main memory means; and velocity error compensating means for compensating velocity errors of video signals obtained from said output circuit means in accordance with respective detected velocity errors stored in said velocity error memory means.

4. A time base corrector according to claim 3; in which said control means further controls the writing and reading of velocity errors into and out of said velocity error memory means.

5. A time base corrector according to claim 4; in which said control means includes write addressing means generating write addresses in a repeating cyclic order which are applied to said main memory means and said velocity error memory means for controlling the writing of video signals and velocity errors, respectively, at the corresponding addresses therein, and read addressing means generating read addresses which are applied to said main memory means and said velocity error memory means for controlling the reading out of video signals and velocity errors, respectively, from the corresponding addresses therein.

6. A time base corrector according to claim 3, in which said velocity error compensating means includes phase modulator means for phase modulating said read clock pulses in accordance with said detected velocity errors stored in the velocity error memory means.

7. A time base corrector according to claim 3, in which said velocity error memory means includes a plurality of capacitors respectively corresponding to said addresses.

* * * * *